(12) United States Patent
Hundemer

(10) Patent No.: US 9,961,123 B2
(45) Date of Patent: May 1, 2018

(54) MEDIA PRODUCTION SYSTEM WITH SCORE-BASED DISPLAY FEATURE

(71) Applicant: Tribune Broadcasting Company, LLC, Chicago, IL (US)

(72) Inventor: Hank J. Hundemer, Bellevue, KY (US)

(73) Assignee: Tribune Broadcasting Company, LLC, Chicago, IL (US)

( * ) Notice: Subject to any disclaimer, the term of this patent is extended or adjusted under 35 U.S.C. 154(b) by 0 days. days.

(21) Appl. No.: 15/211,193

(22) Filed: Jul. 15, 2016

(65) Prior Publication Data

US 2017/0019702 A1   Jan. 19, 2017

Related U.S. Application Data

(60) Provisional application No. 62/194,171, filed on Jul. 17, 2015, provisional application No. 62/242,593, filed on Oct. 16, 2015.

(51) Int. Cl.
*H04L 29/06* (2006.01)
*G06F 3/0482* (2013.01)
(Continued)

(52) U.S. Cl.
CPC .......... *H04L 65/607* (2013.01); *G06F 3/0482* (2013.01); *G06F 3/0486* (2013.01);
(Continued)

(58) Field of Classification Search
CPC combination set(s) only.
See application file for complete search history.

(56) References Cited

U.S. PATENT DOCUMENTS

2003/0149979 A1* 8/2003 Baldwin ................ H04N 7/165
725/39
2007/0044122 A1   2/2007 Scholl et al.
(Continued)

FOREIGN PATENT DOCUMENTS

KR   1020100123059 A   11/2010

OTHER PUBLICATIONS

International Search Report dated Oct. 18, 2016 issued in connection with International Application No. PCT/US2016/042432, filed on Jul. 15, 2016, 3 pages.
(Continued)

*Primary Examiner* — Sumaiya A Chowdhury
(74) *Attorney, Agent, or Firm* — McDonnell Boehnen Hulbert & Berghoff LLP

(57) ABSTRACT

In one aspect, an example method includes (i) selecting, by a computing system, a media content item from a set of multiple media content items; (ii) identifying, by the computing system, a set of operations that a media production system and/or a media broadcast system performed in connection with the selected media content item; (iii) for each operation in the identified set of operations, determining, by the computing system, a respective operation score; (iv) using, by the computing system, the one or more determined operation scores to determine a media content item score of the selected media content item; (v) repeating (i)-(iv) above for each remaining media content item in the set of multiple media content items; and (vi) displaying a reference to each media content item in the set of multiple media content items, wherein the displayed references are arranged based on the determined media content item scores.

12 Claims, 6 Drawing Sheets

(51) Int. Cl.
*G06F 3/0486* (2013.01)
*G06F 17/24* (2006.01)
*H04L 29/08* (2006.01)
*H04L 12/58* (2006.01)
*H04N 21/262* (2011.01)
*H04N 21/84* (2011.01)
*H04N 21/234* (2011.01)
*H04N 21/2665* (2011.01)
*H04N 21/854* (2011.01)
*G11B 27/00* (2006.01)

(52) U.S. Cl.
CPC ............ *G06F 17/248* (2013.01); *G11B 27/00* (2013.01); *H04L 51/10* (2013.01); *H04L 51/32* (2013.01); *H04L 65/4076* (2013.01); *H04L 65/602* (2013.01); *H04L 65/604* (2013.01); *H04L 67/02* (2013.01); *H04L 67/10* (2013.01); *H04L 67/18* (2013.01); *H04L 67/306* (2013.01); *H04L 67/42* (2013.01); *H04N 21/23424* (2013.01); *H04N 21/262* (2013.01); *H04N 21/2665* (2013.01); *H04N 21/84* (2013.01); *H04N 21/854* (2013.01)

(56) References Cited

U.S. PATENT DOCUMENTS

| | | | |
|---|---|---|---|
| 2008/0077568 A1* | 3/2008 | Ott | G06F 17/30864 |
| 2009/0055385 A1 | 2/2009 | Jeon et al. | |
| 2010/0293048 A1* | 11/2010 | Singolda | G06Q 30/02 705/14.43 |
| 2012/0185892 A1* | 7/2012 | Camplejohn | H04N 21/2743 725/27 |
| 2014/0244660 A1* | 8/2014 | Lewis | G06F 17/30864 707/748 |
| 2015/0039608 A1* | 2/2015 | Basilico | G06F 17/3053 707/734 |

OTHER PUBLICATIONS

Written Opinion of the International Searching Authority dated Oct. 18, 2016 issued in connection with International Application No. PCT/US2016/042432, filed on Jul. 15, 2016, 7 pages.

\* cited by examiner

| Story Title | Video Content Item Identifier | Duration | DVE Identifier |
|---|---|---|---|
| STORY A | VCI ID A | 00:02:00:00 | DVE ID A |
| STORY B | VCI ID B | 00:01:30:00 | |
| STORY C | | 00:00:30:00 | |
| STORY D | VCI ID D | 00:00:30:00 | |
| STORY E | VCI ID E | 00:00:30:00 | |
| COMMERCIAL BREAK | | | |
| STORY F | VCI ID F | 00:02:00:00 | DVE ID F |
| STORY G | | 00:01:30:00 | |
| STORY H | VCI ID H | 00:00:30:00 | |
| STORY I | VCI ID I | 00:00:30:00 | |

Figure 5

MEDIA PRODUCTION SYSTEM WITH SCORE-BASED DISPLAY FEATURE

RELATED DISCLOSURES

This disclosure claims priority to (i) U.S. Provisional Patent Application No. 62/194,171, titled "Video Production System with Social Media Features," filed on Jul. 17, 2015, and (ii) U.S. Provisional Patent Application No. 62/242,593, titled "Video Production System with Content-Related Features," filed on Oct. 16, 2015, both of which are hereby incorporated by reference in their entirety.

USAGE AND TERMINOLOGY

In this disclosure, unless otherwise specified and/or unless the particular context clearly dictates otherwise, the terms "a" or "an" mean at least one, and the term "the" means the at least one.

SUMMARY

In one aspect, an example method is disclosed. The method includes (i) selecting, by a computing system, a media content item from a set of multiple media content items; (ii) identifying, by the computing system, a set of operations that a media production system (MPS) and/or a media broadcast system (MBS) performed in connection with the selected media content item; (iii) for each operation in the identified set of operations, determining, by the computing system, a respective operation score; (iv) using, by the computing system, the one or more determined operation scores to determine a media content item score of the selected media content item; (v) repeating (i)-(iv) above for each remaining media content item in the set of multiple media content items; and (vi) displaying, by the computing system, a reference to each media content item in the set of multiple media content items, wherein the displayed references are arranged based on the determined media content item scores.

In another aspect, an example non-transitory computer-readable medium is disclosed. The computer-readable medium has stored thereon program instructions that upon execution by a processor, cause performance of a set of acts including (i) selecting, by a computing system, a media content item from a set of multiple media content items; (ii) identifying, by the computing system, a set of operations that a MPS and/or a MBS performed in connection with the selected media content item; (iii) for each operation in the identified set of operations, determining, by the computing system, a respective operation score; (iv) using, by the computing system, the one or more determined operation scores to determine a media content item score of the selected media content item; (v) repeating (i)-(iv) above for each remaining media content item in the set of multiple media content items; and (vi) displaying, by the computing system, a reference to each media content item in the set of multiple media content items, wherein the displayed references are arranged based on the determined media content item scores.

In another aspect, an example computing system is disclosed. The computing system is configured for performing a set of acts including (i) selecting, by the computing system, a media content item from a set of multiple media content items; (ii) identifying, by the computing system, a set of operations that a MPS and/or a MBS performed in connection with the selected media content item; (iii) for each operation in the identified set of operations, determining, by the computing system, a respective operation score; (iv) using, by the computing system, the one or more determined operation scores to determine a media content item score of the selected media content item; (v) repeating (i)-(iv) above for each remaining media content item in the set of multiple media content items; and (vi) displaying, by the computing system, a reference to each media content item in the set of multiple media content items, wherein the displayed references are arranged based on the determined media content item scores.

BRIEF DESCRIPTION OF THE DRAWINGS

FIG. 5 is a simplified block diagram of an example program schedule.

DETAILED DESCRIPTION

I. Overview

Figure 1:
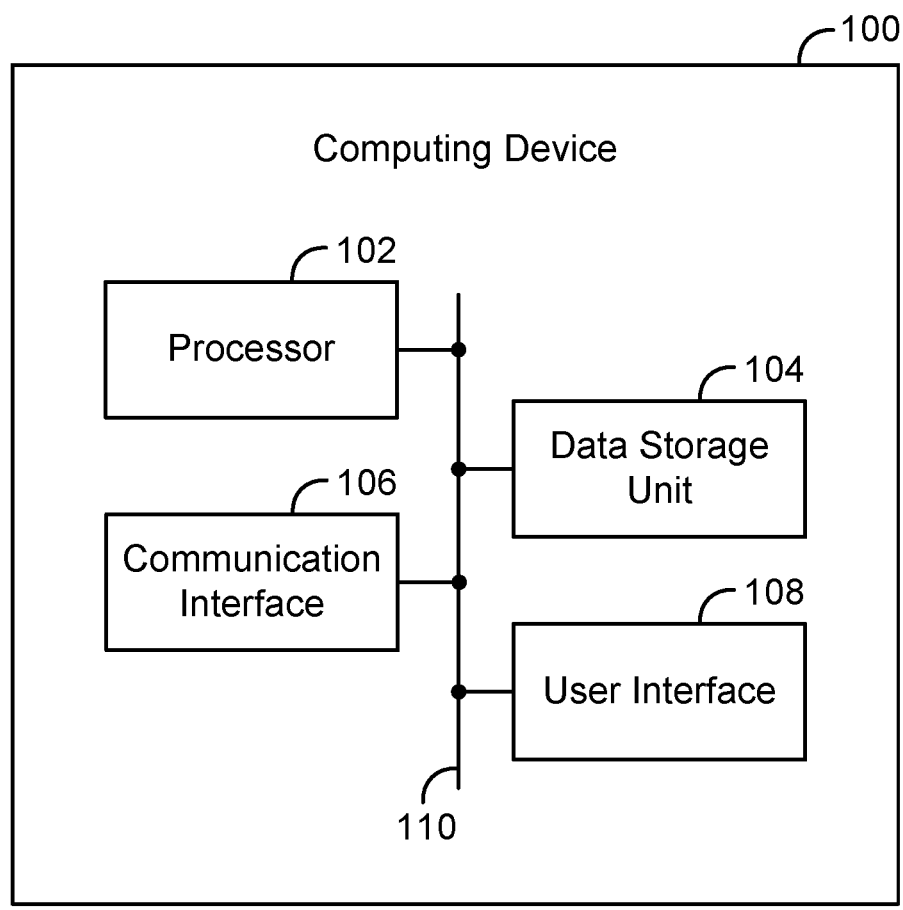
FIG. 1 is a simplified block diagram of an example computing device.

A video-production system (VPS) can generate video content that can serve as or be part of a video program (e.g., a news program). The VPS can then transmit the video content to a video-broadcast system (VBS), which in turn can transmit the video content to an end-user device for presentation of the video content to an end-user.

The VPS can include various components to facilitate generating video content. For example, the VPS can include a video source, a digital-video effect (DVE) system, a scheduling system, and a sequencing system. The video source can generate video content, and can transmit the video content to the DVE system. The DVE system can use the video content and a DVE template to execute a DVE, which can cause the DVE system to generate new video content that is a modified version of the received video content. For example, the generated video content can include the received video content with local weather content overlaid thereon.

The scheduling system can create a program schedule, perhaps based on input received from a user (e.g., a producer or technical director) via a user interface. The sequencing system can process records in the program schedule, and based on the processed records, can control one or more components of the VPS, such as the video source and the DVE system, to facilitate generating video content.

As noted above, the scheduling system can create and/or edit a program schedule of a video program. To facilitate this, the scheduling system can allow a user to search for and select a video content item so that it can be included in a video program. The scheduling system can allow a user to search for video content items in various ways. For example, the scheduling system can display a group of references to video content items that have certain properties (e.g., that are "popular") and thus that are likely to be of interest to the user. The scheduling system can determine whether a video content item is sufficiently popular by considering how the video content item is being used within the VPS or elsewhere, as described in greater detail below.

The scheduling system can then select a video content item, such as by selecting one of the displayed references. The scheduling system can also allow a user to select a position of the program schedule where the user would like the selected video content item to be referenced. The user can also provide input to specify the manner in which the user would like the selected video content item to be integrated into the video program. Based on the user's behavior (e.g., the user's selections and/or input), the scheduling system can create and/or edit the program schedule accordingly. For example, based on the user's behavior, the scheduling system can add to a program schedule a reference to a selected video content item.

As noted above, the scheduling system can determine whether a video content item is sufficiently popular by considering how the video content item is being used within the VPS or elsewhere. In one example, the scheduling system can select one or more video content items from a set of multiple video content items, and can identify a set of operations that the VPS and/or the VBS performed in connection with the selected video content item. Example operations can include (i) the VPS providing a preview of the selected video content item, (ii) the VPS adding a reference to the selected video content item to a program schedule for a video program, (iii) the VPS transmitting the selected video content item to another VPS, and (iv) the VBS transmitting the selected video content item to the end-user device for presentation of the video content item on the end-user device.

For each operation in the identified set of operations, the scheduling system can determine a respective operation score. The operation score can indicate a relative value or significance of an operation as compared to one or more other operations. The scheduling system can then use the one or more determined operation scores to determine a video content item score of the selected video content item. In one example, the scheduling system can do this by adding the one or more determine operation scores together to arrive at the determined video content item score.

The scheduling system can then repeat the selecting, identifying, and (both) determining acts discussed above for each remaining content item in the set of multiple video content items. This can allow the scheduling system to determine a respective video content item score for each video content item in the set of multiple video content items.

The scheduling system can then display a reference to each video content item in the set of multiple video content items. In doing so, the scheduling system can arrange the displayed references based on the determined video content scores.

In one example, the scheduling system can arrange the displayed references in a list and can arrange them such that the corresponding content item scores are in a descending order. By arranging the displayed references in this way, in one example, the user can start at the top of the list and traverse downwards when deciding whether to select any of the referenced video content items for use in connection with producing a video program. By doing so, the user can begin by consider video content items that are more likely to be of interest to the user, and can then traverse down the list as appropriate.

These features and related features are described in greater below.

II. Example Architecture

A. Computing Device

FIG. 1 is a simplified block diagram of an example computing device 100. The computing device can be configured to perform and/or can perform one or more acts and/or functions, such as those described in this disclosure. The computing device 100 can include various components, such as a processor 102, a data storage unit 104, a communication interface 106, and/or a user interface 108. Each of these components can be connected to each other via a connection mechanism 110.

In this disclosure, the term "connection mechanism" means a mechanism that facilitates communication between two or more components, devices, systems, or other entities. A connection mechanism can be a relatively simple mechanism, such as a cable or system bus, or a relatively complex mechanism, such as a packet-based communication network (e.g., the Internet). In some instances, a connection mechanism can include a non-tangible medium (e.g., in the case where the connection is wireless).

The processor 102 can include a general-purpose processor (e.g., a microprocessor) and/or a special-purpose processor (e.g., a digital signal processor (DSP)). The processor 102 can execute program instructions contained in the data storage unit 104 as discussed below.

The data storage unit 104 can include one or more volatile, non-volatile, removable, and/or non-removable storage components, such as magnetic, optical, or flash storage, and/or can be integrated in whole or in part with the processor 102. Further, the data storage unit 104 can take the form of a non-transitory computer-readable storage medium, having stored thereon program instructions (e.g., compiled or non-compiled program logic and/or machine code) that, upon execution by the processor 102, cause the computing device 100 to perform one or more acts and/or functions, such as those described in this disclosure. These program instructions can define and/or be part of a discrete software application. In some instances, the computing device 100 can execute program instructions in response to receiving an input, such as from the communication interface 106 and/or the user interface 108. The data storage unit 104 can also store other types of data, such as those types described in this disclosure.

The communication interface 106 can allow the computing device 100 to connect with and/or communicate with another other entity according to one or more protocols. In one example, the communication interface 106 can be a wired interface, such as an Ethernet interface or a high-definition serial-digital-interface (HD-SDI). In another example, the communication interface 106 can be a wireless interface, such as a cellular or WI-FI interface. In this disclosure, a connection can be a direct connection or an indirect connection, the latter being a connection that passes through and/or traverses one or more entities, such as a router, switcher, or other network device. Likewise, in this disclosure, a transmission can be a direct transmission or an indirect transmission.

The user interface 108 can include hardware and/or software components that facilitate interaction between the computing device 100 and a user of the computing device 100, if applicable. As such, the user interface 108 can include input components such as a keyboard, a keypad, a mouse, a touch-sensitive panel, a microphone, and/or a camera, and/or output components such as a display device (which, for example, can be combined with a touch-sensitive panel), a sound speaker, and/or a haptic feedback system.

The computing device 100 can take various forms, such as a workstation terminal, a desktop computer, a laptop, a tablet, a mobile phone, a set-top box, and/or a television.

B. Video System

Figure 2:
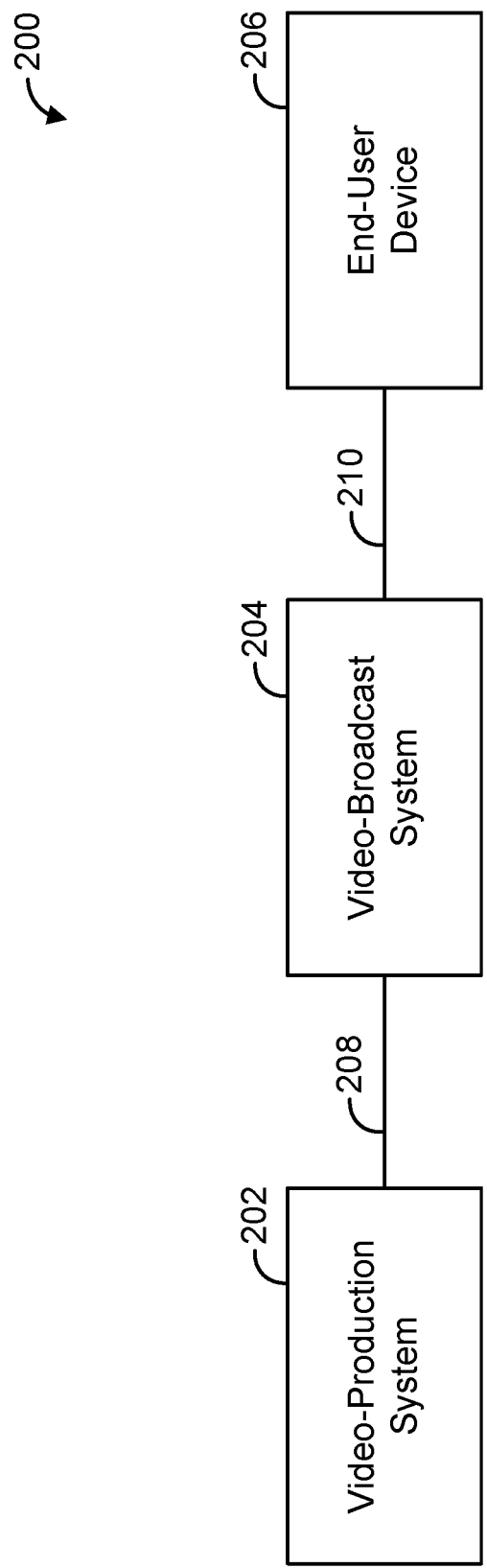
FIG. 2 is a simplified block diagram of an example video system.

FIG. 2 is a simplified block diagram of an example video system 200. The video system 200 can perform various acts and/or functions related to video content, and can be implemented as a computing system. In this disclosure, the term "computing system" means a system that includes at least one computing device. In some instances, a computing system can include one or more other computing systems.

The video system 200 can include various components, such as a VPS 202, a VBS 204, and an end-user device 206, each of which can be implemented as a computing system. The video system 200 can also include a connection mechanism 208, which connects the VPS 202 with the VBS 204; and a connection mechanism 210, which connects the VBS 204 with the end-user device 206.

Figure 3:
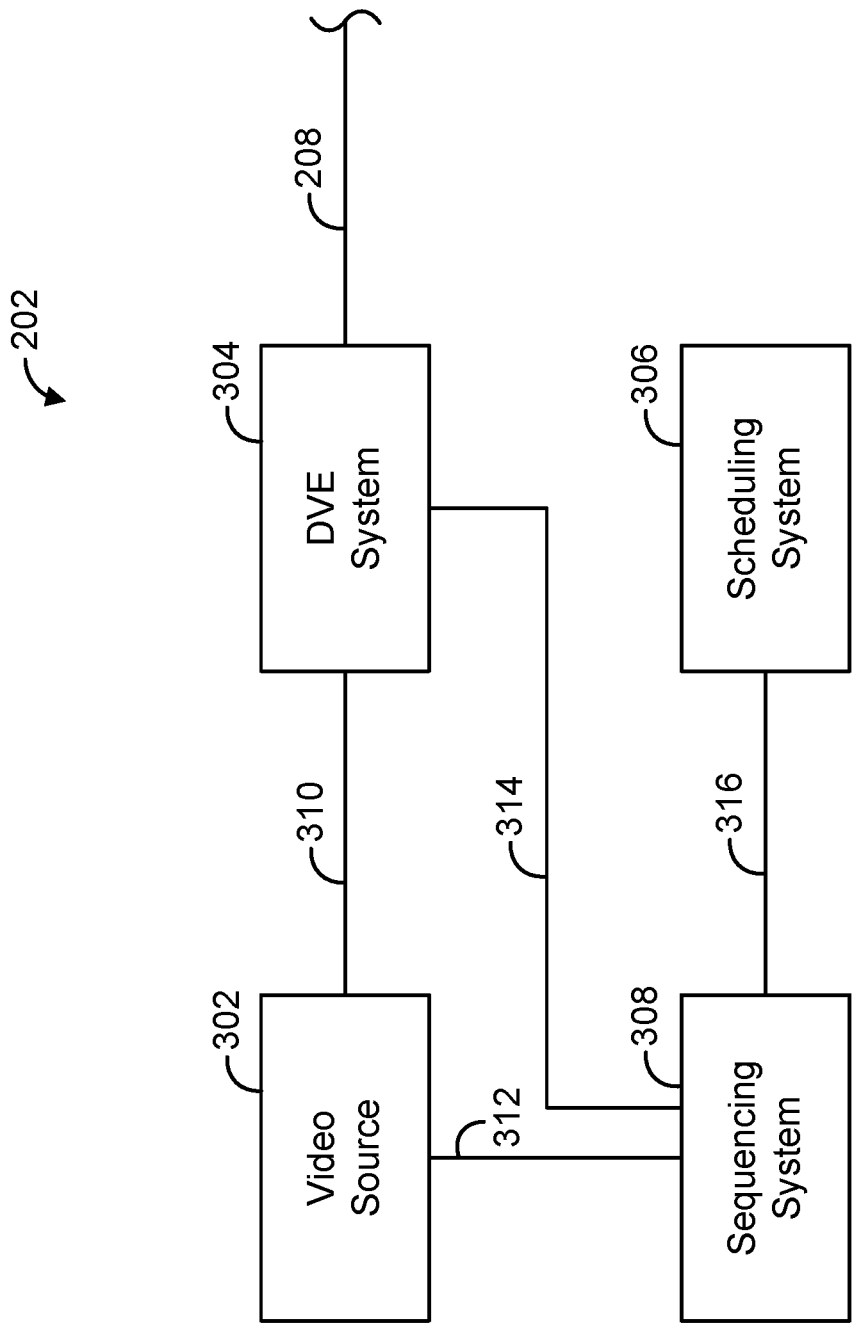
FIG. 3 is a simplified block diagram of an example video production system.

FIG. 3 is a simplified block diagram of an example VPS 202. The VPS 202 can include various components, such as a video source 302, a digital video-effect (DVE) system 304, a scheduling system 306, and a sequencing system 308, each of which can be implemented as a computing system. The VPS 202 can also include a connection mechanism 310, which connects the video source 302 with the DVE system 304; a connection mechanism 312, which connects the video source 302 with the sequencing system 308; a connection mechanism 314, which connects the DVE system 304 with the sequencing system 308; and a connection mechanism 316, which connects the scheduling system 306 with the sequencing system 308.

The video source 302 can take various forms, such as a character generator, a video server, a satellite receiver, a video camera, or a DVE system. An example character generator is the Viz Trio provided by Viz Rt™ of Bergen, Norway. An example video server is the K2 server provided by Grass Valley™ of San Francisco, Calif.

The DVE system 304 can take various forms, such as a production switcher. An example production switcher is the Vision Octane production switcher provided by Ross Video Ltd. of Iroquois, Ontario in Canada.

The scheduling system 306 can take various forms. An example scheduling system is WO Traffic provided by WideOrbit, Inc. of San Francisco, Calif. Another example scheduling system is OSi-Traffic provided by Harris Corporation of Melbourne, Fla.

The sequencing system 308 can take various forms. A sequencing system is sometimes referred to in the industry as a "production automation system."

Referring back to FIG. 2, the VBS 204 can include various components, such as a terrestrial antenna or a satellite transmitter, each of which can be implemented as a computing system.

Each of the video-based entities described in this disclosure can include or be integrated with a corresponding audio-based entity. Likewise, the video content described in this disclosure can include or be integrated with corresponding audio content. More generally, the entities can be media-based entities such as a media production system (MPS) and a media broadcast system (MBS).

III. Example Operations

The video system 200 and/or components thereof can perform various acts and/or functions. These and related features will now be described.

The video system 200 can perform various acts and/or functions related to video content. For example, the video system 200 can receive, generate, output, and/or transmit a video program in the form of video content. In this disclosure, the act of receiving, generating, outputting, and/or transmitting video content can occur in various ways and/or according to various standards. For example, the act of receiving, outputting, and/or transmitting video content can include receiving, outputting, and/or transmitting a video stream representing the video content, such as over Internet Protocol (IP) or in accordance with the high-definition serial digital interface (HD-SDI) standard. Likewise, the act of generating content can include generating a video stream representing the video content. Also, the act of receiving, generating, outputting, and/or transmitting video content can include receiving, generating, outputting, and/or transmitting an encoded or decoded version of the video content.

The VPS 202 can perform various acts and/or functions related to video content production. In this context, the video source 302 can generate and/or output video content, and can transmit the video content to the DVE system 304. In practice, the VPS 202 is likely to include multiple video sources and corresponding connection mechanisms.

As noted above, the video source 302 can take the form of a character generator. A character generator can generate video content based on input data. For example, a character generator can receive weather data and can then generate video content that includes the weather data. In some instances, a character generator can use an ordered set of content items to generate video content that includes the content items in the specified order. This type of generated video content is sometimes referred to in the industry as a "ticker." The content items can include various types of content, such as text and/or images. The ordered set of content items can be stored in various forms, such as in the form of an Extensible Markup Language (XML) file.

As also noted above, the video source 302 can also take the form of a video server. A video server can store video content (e.g., in the form of a file). Further, the video server can use the stored video content to generate and output a video stream representing the video content. This is sometimes referred to in the industry as the video server playing out the video content. The video server 302 can then transmit the video stream, thereby transmitting the video content, to the DVE system 304.

The DVE system 304 can perform various acts and/or functions related to DVEs. For example, the DVE system 304 can create and/or edit a DVE template, perhaps based on input received from a user via a user interface. Further, the DVE system 304 can use a DVE template, and perhaps video content or other content, to generate and/or output video content. This is sometimes referred to in the industry as the DVE system "executing a DVE." The DVE system 304 can then transmit the generated video content to the VBS 204.

A DVE template can be configured in various ways, which can allow the DVE system to execute various types of DVEs. In one example, a DVE template can specify that the DVE system 304 is to receive video content and other content (e.g., a channel logo), and is to overlay the other content on the video content, thereby generating a modified version of the video content. As such, in one example, the DVE system 304 can generate video content by modifying other video content.

Figure 4A:
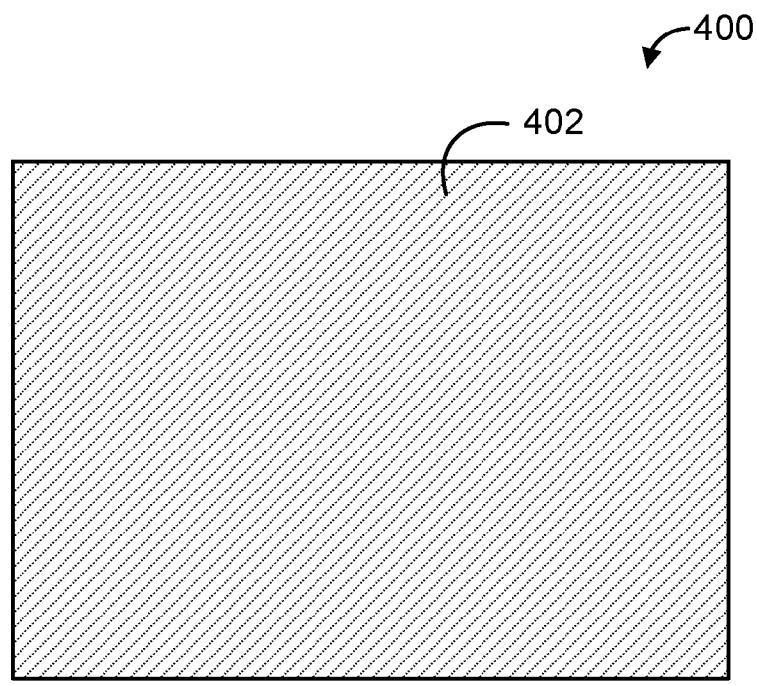
FIG. 4A is a simplified diagram of an example frame of video content, without content overlaid thereon.
Figure 4B:
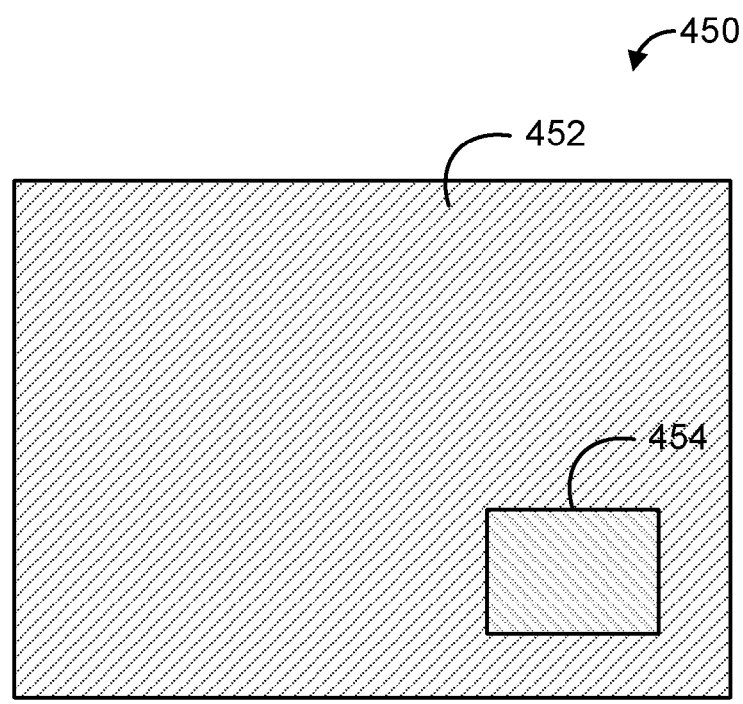
FIG. 4B is a simplified diagram of an example frame of video content, with content overlaid thereon.

FIGS. 4A and 4B help illustrate the concept of overlaying content on video content. FIG. 4A is a simplified depiction of an example frame 400 of video content. Frame 400 includes content 402, but does not include content overlaid on content 402. For comparison, FIG. 4B is a simplified depiction of another example frame 450 of video content. Frame 450 includes content 452 and content 454 overlaid on content 452.

In some cases, A DVE template can specify where the DVE is to obtain content to be used in connection with executing a DVE. For example, the DVE template can specify that the DVE system is to receive video content on a particular input of the DVE system 304. As another example, the DVE template can specify that the DVE system 304 is to retrieve content from a particular storage location within the data storage unit of the DVE system 304. Thus, the DVE system 304 can obtain content for use in connection with executing a DVE in various ways, such as by receiving video content from the video source 302 or by retrieving content from a particular storage location within a data storage unit of the DVE system 304.

As noted above, a DVE template can be configured in various ways, which can allow the DVE system to execute various types of DVEs. As another example of this, a DVE template can specify that the DVE system 304 is to receive first video content and second video content, and is to generate video content that includes the first video content and the second video content, each down-scaled and contained within a respective one of two windows positioned side-by-side. As such, the DVE system 304 can generate video content by scaling and/or re-positioning video content.

In some instances, the DVE system 304 can select a DVE template from among a set of selectable DVE templates, and can then use the selected template to execute a corresponding DVE. As noted above, the DVE system 304 can create and/or edit a DVE template. When the DVE system 304 does this, the DVE system 304 can generate and store corresponding program instructions for later retrieval and execution. Given this, the act of the DVE system 304 executing a DVE can include the DVE system 304 retrieving and executing program instructions corresponding to a DVE template. Also, in some instances, the DVE system 304 can execute multiple DVEs in serial or overlapping fashion.

The scheduling system 306 can perform acts and/or functions related to scheduling and/or managing video content production. For example, the scheduling system 306 can create and/or edit a program schedule of a video program, perhaps based on input received from a user via a user interface. The sequencing system 308 can then process records in the program schedule. This can cause the sequencing system 308 to control one or more other components of the VPS 202 to facilitate the VPS 202 generating and/or outputting video content, which can serve as or be part of a video program. As such, based on a program schedule, the sequencing system 308 can control the video source 302, and/or the DVE system 304.

A program schedule (sometimes referred to in the industry as a "rundown") serves as a schedule or outline of a video program and can include multiple records. A video program can be conceptually divided into multiple logically-separated portions (sometimes referred to in the industry as "stories"). As such, each portion of the video program can be represented by a separate record of the program schedule. In some cases, each record can also include one or more sub records. Each record (including a sub record) can include various types of data.

FIG. 5 is a simplified diagram of an example program schedule 500. The program schedule 500 includes ten records represented as ten ordered rows. Each record corresponds to a respective portion of a video program, except for one which corresponds to a commercial break. For each portion, the respective record specifies at least one data item that corresponds to that portion of the video program. In particular, each record specifies at least one of a story title, a video-content item identifier, a duration, and a DVE identifier (which can serve as an instruction to execute the identified DVE).

A video-content item can consist of logically-related video content. For example, a video-content item can be a commercial. As another example, a video-content item can be a portion of a television program that is scheduled between two commercial breaks. This is sometimes referred to in the industry as a "program segment."

As shown in FIG. 5, the first record specifies a story title of STORY A, a video content identifier of VCI ID A, a duration of 00:02:00:00 (in hours:minutes:seconds:frames format), and a DVE identifier of DVE ID A. As such, upon the sequencing system 308 processing the first record, the sequencing system 308 can cause the video source 302 to playout a video-content item identified by the identifier VCI ID A for two minutes, and further can cause the DVE system 304 to execute a DVE identified by the identifier DVE ID A, which for example, can cause the DVE system 304 to overlay content on the identified video-content item.

It should be noted that the program schedule 500 has been greatly simplified for the purposes of illustrating certain features. In practice, a program schedule is likely to include significantly more data.

In some instances, the sequencing system 308 can process a next record in the program schedule based on a trigger event. In one example, the trigger event can be the sequencing system 308 completing one or more actions related to a current record in the program schedule. In another example, the trigger event can be the sequencing system 308 receiving input from a user via a user interface.

Referring back to FIG. 2, the VBS 204 can receive video content from the VPS 202, which in turn can transmit the video content to the end-user device 206 for presentation of the video content to an end user. In practice, the VBS 204 can transmit video content to a large number of end-user devices for presentation of the video content to a large number of end users. The VBS 204 can transmit video content to the end-user device 206 in various ways. For example, VBS 204 can transmit video content to the end-user device 206 over-the-air or via a packet-based network such as the Internet. The end-user device 206 can receive video content from the VBS 204, and can present the video content to an end user via a user interface.

As noted above, the scheduling system 306 can create and/or edit a program schedule of a video program, perhaps based on input received from a user via a user interface. To facilitate this, the scheduling system 306 can allow a user to search for and select a video content item so that it can be included in a video program. The scheduling system 306 can allow a user to search for video content items in various ways, such as by displaying, through a folder-based file system, references to video content items that the user can browse through.

The scheduling system 306 can also allow a user to select a video content item. In one example, the user can do so by clicking on a displayed reference to the video content item. The displayed reference can take various forms, such as a filename or a thumbnail image (e.g., an image that is a representative frame of the video content item).

In some cases, it can be challenging for a user to search for and select a video content item. Indeed, this process is generally a time-consuming and labor-intensive process using conventional computing systems and technology platforms. This can be particularly problematic in the context of a news program in which it may be beneficial to quickly search for and select a video content item for integration into the news program. The VPS 202 can overcome these and other technological challenges. Among other things, the VPS 202 can provide technological solutions that enable a user to more efficiently search for and select a video content item, and thus to more efficiently produce a video program.

In line with the discussion above, as another way that the scheduling system 306 can allow a user to search for video content items, the scheduling system 306 can display a group of references to video content items that have certain properties (e.g., that are "popular") and thus that are likely to be of interest to the user. The scheduling system 306 can determine whether a video content item is sufficiently popular by considering how the video content item is being used within the VPS 202 or elsewhere, as described in greater detail below. The scheduling system 306 can select a video content item, such as by selecting one of the displayed references.

The scheduling system 306 can also allow a user to preview a video content item. In one example, the scheduling system 306 can provide a preview of a video content item by playing out and displaying a portion of the video content item in response to receiving a request from a user.

The scheduling system 306 can also allow a user to select a position of the program schedule where the user would like the selected video content item to be referenced. In one example, the user can select the position by clicking and holding a reference to a video content item, dragging and dropping the reference to a desired position within a displayed program schedule, and then releasing the held click.

The user can also provide input to specify the manner in which the user would like the selected video content item to be integrated into the video program. For example, the user can specify whether the selected video content item should be presented as "full screen" content or whether it should be presented on a portion of the screen (e.g., as overlay content through use of a DVE). Based on the user's behavior (e.g., the user's selections and/or input), the scheduling system 306 can create and/or edit the program schedule accordingly. For example, based on the user's behavior, the scheduling system 306 can add to a program schedule a reference to a selected video content item.

In some cases, the scheduling system 306 can display references to video content items that are stored within the VPS 202. However, in other cases, the scheduling system 306 can display references to video content items that are stored in another VPS (e.g., another VPS in another geographic market). In these cases, the VPS 202 can retrieve the selected video content item from the other VPS, and thus the other VPS can transmit the selected video content item to the VPS 202.

As noted above, the scheduling system 306 can determine whether a video content item is sufficiently popular by considering how the video content item is being used within the VPS 202 or elsewhere. In one example, the scheduling system 306 can select one or more video content items from a set of multiple video content items, and can identify a set of operations that the VPS 202 and/or the VBS 204 performed in connection with the selected video content item. Example operations can include (i) the VPS 202 providing a preview of the selected video content item, (ii) the VPS 202 adding a reference to the selected video content item to a program schedule for a video program, (iii) the VPS 202 transmitting the selected video content item to another VPS, and (iv) the VBS 204 transmitting the selected video content item to the end-user device 206 for presentation of the video content item on the end-user device 206. In some cases, the VPS 202 and/or the VBS 204 can perform the same operation multiple times in connection with the selected video content item. Other operations are possible as well.

The VPS 202 and/or the VBS 204 can store and maintain a log of these and other operations that it performs. Thus, the scheduling system 306 can identify the set of operations that the VPS 202 and/or the VBS 204 performed in connection with the selected video content item based on records in an operation log.

For each operation in the identified set of operations, the scheduling system 306 can determine a respective operation score. In one example, the scheduling system 306 can do this by looking up the score in a table (e.g., stored in a data storage unit of the scheduling system 306) that maps each operation to a respective operation score. Further, the scheduling system 306 can allow a user to edit the table as desired.

The operation score can indicate a relative value or significance of an operation as compared to one or more other operations. As such, at least two of the operation scores can be different from each other. For example, assuming that a higher score for an operation suggests that the corresponding video content item is more likely to be of interest to a user, in one example, the scheduling system can determine operation scores as follows. For the operation of the VPS 202 providing a preview of the selected video content item, the scheduling system 306 can determine an operation score of 5. For the operation of the VPS 202 adding a reference to the selected video content item to a program schedule for a video program, the scheduling system 306 can determine an operation score of 20. For the operation of the VPS 202 transmitting the selected video content item to another VPS, the scheduling system 306 can determine an operation score of 50. And for the operation of the VBS 204 transmitting the selected video content item to the end-user device 206 for presentation of the video content item on the end-user device 206, the scheduling system 306 can determine an operation score of 100.

The scheduling system 306 can then use the one or more determined operation scores to determine a video content item score of the selected video content item. In one example, the scheduling system 306 can do this by adding the one or more determine operation scores together to arrive at the determined video content item score.

For example, in the case where the scheduling system 306 determined that the VPS 202 provided a preview of the selected video content item nine times, the VPS 202 added a reference to the selected video content item to a program schedule for a video program three times, the VPS 202 transmitted the selected video content item to another VPS once, and the VBS 204 transmitted the selected video content item to the end-user device 206 three times, the scheduling system 306 can determine a video content item score of 455 ((5*9)+(20*3)+(50*1)+(100*3)).

As another example, in the case where the scheduling system 306 determined that the VPS 202 provided a preview of the selected video content item six times, the VPS 202 added a reference to the selected video content item to a program schedule for a video program twice, and the VBS 204 transmitted the selected video content item to the end-user device 206 once, the scheduling system 306 can determine a video content item score of 170 ((5*6)+(20*2)+(100*1)).

The scheduling system 306 can then repeat the selecting, identifying, and (both) determining acts discussed above for each remaining content item in the set of multiple video content items. This can allow the scheduling system 306 to determine a respective video content item score for each video content item in the set of multiple video content items. For a given video content item, the scheduling system 306 can store the determined video content item score data in association with the selected video content item (e.g., as metadata).

The scheduling system 306 can then display a reference to each video content item in the set of multiple video content items. In doing so, the scheduling system 306 can arrange the displayed references based on the determined video content scores. In this disclosure, the phrase "based on" means based at least in part on.

In one example, the scheduling system 306 can arrange the displayed references in a list and can arrange them such that the corresponding content item scores are in a descending order. For instance, in the case where a set of multiple video content items includes a first video content item, a second video content item, and a third video content item, with each having a corresponding score of 455, 170, and 325, respectively, the list can have a top row, a middle row, and a bottom row, and the scheduling system 306 can display a reference to the first video content item in the top row, a reference to the third video content item in the middle row, and a reference to the second video content item in the bottom row.

By arranging the displayed references in this way, in one example, the user can start at the top of the list and traverse downwards when deciding whether to select any of the referenced video content items for use in connection with producing a video program. By doing so, the user can begin by consider video content items that are more likely to be of interest to the user, and can then traverse down the list as appropriate. This can save the user time and can allow the user to select a video content item, and thus to produce a video program, in a more efficient manner.

In another example, the scheduling system 306 can arrange the displayed references in a list and can arrange them such that the corresponding content item scores are in an ascending order. For instance, in the case where the set of multiple video content items includes a first video content item, a second video content item, and a third video content item, with each having a corresponding score of 455, 170, and 325, respectively, the list can have a top row, a middle row, and a bottom row, and the scheduling system 306 can display a reference to the second video content item in the top row, a reference to the third video content item in the middle row, and a reference to the first video content item in the bottom row.

By arranging the displayed references in this way, in one example, the user can start at the bottom of the list and traverse downwards when deciding whether to select any of the referenced video content items for use in connection with producing a video program. By doing so, the user can begin by consider video content items that are more likely to be of interest to the user, and can then traverse up the list as appropriate. Notably, these examples are for illustration purposes. In practice, the set of video content items is likely to include more video content items, though it does not need to do so. Also, in practice, the scheduling system 306 can display the references in various other ways based on the determined one or more video content item scores.

Although some of the acts and/or functions described in this disclosure have been described in the context of the video system 200 and as video-related concepts (e.g., generating a video program), the acts and/or functions can also be applied in the context of an audio system and used as audio-related concepts (e.g., generating an audio program). More generally, the acts and/or functions described in this disclosure can be applied in the context of a media system and used as media-related concepts (e.g., generating a media program).

Figure 6:
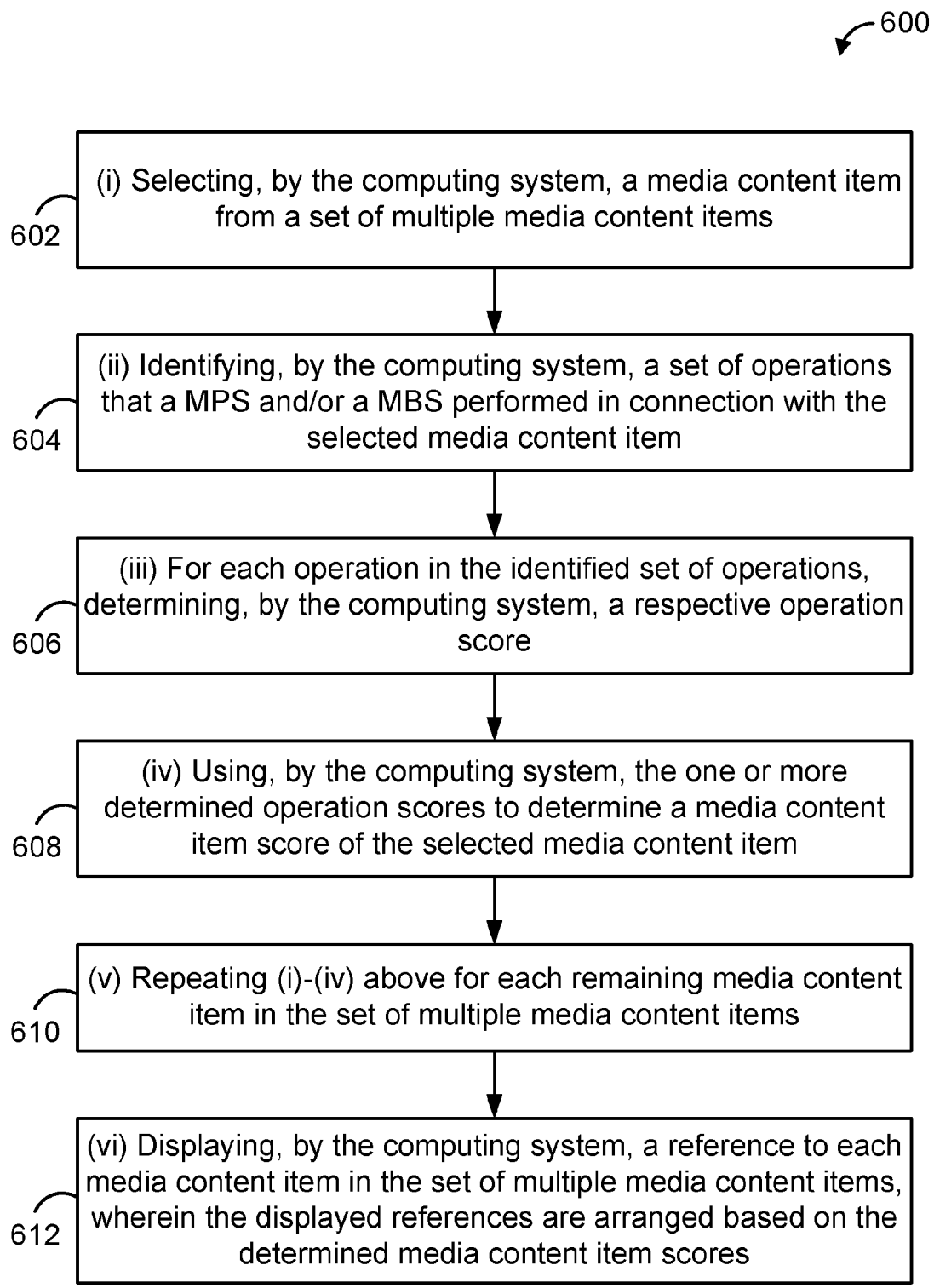
FIG. 6 is a flow chart of an example method.

FIG. 6 is a flow chart illustrating an example method 600.

At block 602, the method 600 can include (i) selecting, by a computing system, a media content item from a set of multiple media content items.

At block 604, the method 600 can include (ii) identifying, by the computing system, a set of operations that a MPS and/or a MBS performed in connection with the selected media content item.

At block 606, the method 600 can include (iii) for each operation in the identified set of operations, determining, by the computing system, a respective operation score.

At block 608, the method 600 can include (iv) using, by the computing system, the one or more determined operation scores to determine a media content item score of the selected media content item.

At block 610, the method 600 can include (v) repeating (i)-(iv) above for each remaining media content item in the set of multiple media content items.

At block 612, the method 600 can include (vi) displaying, by the computing system, a reference to each media content item in the set of multiple media content items, wherein the displayed references are arranged based on the determined media content item scores.

IV. Example Variations

Although some of the acts and/or functions described in this disclosure have been described as being performed by a particular entity, the acts and/or functions can be performed by any entity, such as those entities described in this disclosure. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required.

Although certain variations have been discussed in connection with one or more example of this disclosure, these variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A method comprising:
   (i) selecting, by a computing system, a media content item from a set of multiple media content items;
   (ii) identifying, by the computing system, a set of operations that a media production system (MPS) performed in connection with the selected media content item, wherein the MPS is configured for generating and transmitting media content to a media broadcast system (MBS) for distribution to end-users, and wherein the set of operations comprises an operation selected from the group consisting of (i) a first operation of the MPS providing a preview of the selected media content item, (ii) a second operation of the MPS adding a reference to the selected media content item to a program schedule for a media program, and (iii) a third operation of the MPS transmitting the selected media content item to another MPS;

(iii) for each operation in the identified set of operations, determining, by the computing system, a respective operation score;

(iv) using, by the computing system, the one or more determined operation scores to determine a media content item score of the selected media content item;

(v) repeating (i)-(iv) above for each remaining media content item in the set of multiple media content items; and (vi) displaying, by the computing system, a reference to each media content item in the set of multiple media content items, wherein the displayed references are arranged based on the determined media content item scores.

2. The method of claim 1, wherein the computing system is the MPS.

3. The method of claim 1, wherein the MPS is a video production system and the set of multiple media content items is a set of multiple video content items.

4. The method of claim 1, wherein at least two of the determined operation scores are different from each other.

5. The method of claim 1, wherein the displayed references are arranged in a list and are arranged such that the corresponding content item scores are in an ascending order or a descending order.

6. A non-transitory computer-readable medium having stored thereon program instructions that upon execution by a processor, cause performance of a set of acts comprising:

(i) selecting, by a computing system, a media content item from a set of multiple media content items;

(ii) identifying, by the computing system, a set of operations that a media production system (MPS) performed in connection with the selected media content item, wherein the MPS is configured for generating and transmitting media content to a media broadcast system (MBS) for distribution to end-users, and wherein the set of operations comprises an operation selected from the group consisting of (i) a first operation of the MPS providing a preview of the selected media content item, (ii) a second operation of the MPS adding a reference to the selected media content item to a program schedule for a media program, and (iii) a third operation of the MPS transmitting the selected media content item to another MPS;

(iii) for each operation in the identified set of operations, determining, by the computing system, a respective operation score;

(iv) using, by the computing system, the one or more determined operation scores to determine a media content item score of the selected media content item;

(v) repeating (i)-(iv) above for each remaining media content item in the set of multiple media content items; and (vi) displaying, by the computing system, a reference to each media content item in the set of multiple media content items, wherein the displayed references are arranged based on the determined media content item scores.

7. The non-transitory computer-readable medium of claim 6, wherein the computing system is the MPS.

8. The non-transitory computer-readable medium of claim 6, wherein the MPS is a video production system and the set of multiple media content items is a set of multiple video content items.

9. The non-transitory computer-readable medium of claim 6, wherein at least two of the determined operation scores are different from each other.

10. The non-transitory computer-readable medium of claim 6, wherein the displayed references are arranged in a list and are arranged such that the corresponding content item scores are in an ascending order or a descending order.

11. A computing system configured for performing a set of acts comprising:

(i) selecting, by the computing system, a media content item from a set of multiple media content items;

(ii) identifying, by the computing system, a set of operations that a media production system (MPS) performed in connection with the selected media content item, wherein the MPS is configured for generating and transmitting media content to a media broadcast system (MBS) for distribution to end-users, and wherein the set of operations comprises an operation selected from the group consisting of (i) a first operation of the MPS providing a preview of the selected media content item, (ii) a second operation of the MPS adding a reference to the selected media content item to a program schedule for a media program, and (iii) a third operation of the MPS transmitting the selected media content item to another MPS;

(iii) for each operation in the identified set of operations, determining, by the computing system, a respective operation score;

(iv) using, by the computing system, the one or more determined operation scores to determine a media content item score of the selected media content item;

(v) repeating (i)-(iv) above for each remaining media content item in the set of multiple media content items; and (vi) displaying, by the computing system, a reference to each media content item in the set of multiple media content items, wherein the displayed references are arranged based on the determined media content item scores.

12. The computing system of claim 11, wherein the computing system is the MPS.

* * * * *